J. G. WINGER.
Cultivator.
No. 18,525.
Patented Oct. 27, 1857.
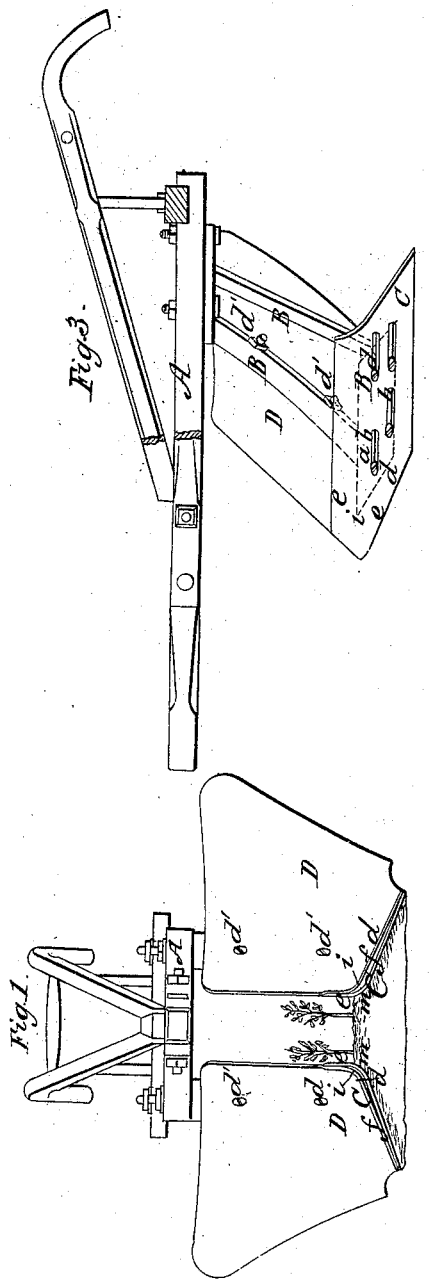
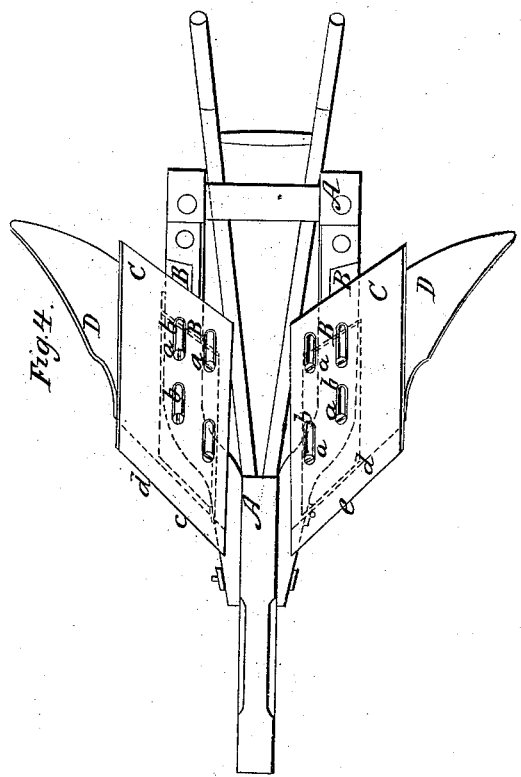
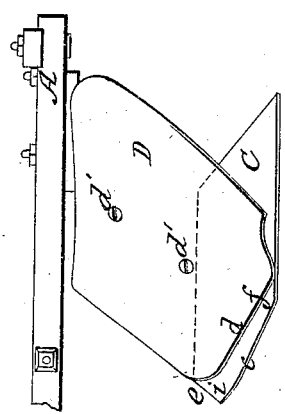

UNITED STATES PATENT OFFICE.

JACOB G. WINGER, OF VICKSBURG, MISSISSIPPI.

IMPROVEMENT IN COTTON-SCRAPERS.

Specification forming part of Letters Patent No. 18,525, dated October 27, 1857.

*To all whom it may concern:*

Be it known that I, J. G. WINGER, of Vicksburg, in the county of Warren and State of Mississippi, have invented a new and useful Improvement in Cotton-Scrapers; and I do hereby declare that the following is a full, clear, and exact description of the construction and operation of the same, reference being had to the annexed drawings, forming part of this specification, in which—

Figure 1 is a front view of the implement. Fig. 2 is a side view. Fig. 3 is a vertical longitudinal section. Fig. 4 is a bottom view.

Similar characters of reference in the several figures denote the same part.

This scraper is designed to act upon both faces of the cotton-ridge at a single operation.

The nature of the invention consists in constructing the double scraper with longitudinally-adjustable cutters whose front edges incline rearward, and whose inclined and vertical surfaces are connected by a curved surface having its convexity toward the ridge, the action of said construction being as hereinafter to be set forth.

In the drawings, A is the frame, which may be laterally adjustable, if desired. From this frame depend the cutter and mold-board supports B B.

The cutters C C are secured in position by bolts $a$ passing through slots $b$ into the aforesaid supports, the slots admitting of the desired longitudinal adjustment to compensate for wear on the cutting-edge $c$. The cutter C consists of an inclined portion, $d$, which rests upon the ridge, as shown in Fig. 1, a vertical portion, $e$, and a curved portion, $i$, connecting the before-mentioned parts. The point of the cutter is at the extremity of the middle element of the curved portion, and from this point the cutting-edge runs backward, as shown in Figs. 2 and 3.

The mold-board D is secured to the supports B by bolts $d'$ $d'$, its lower edge, $f$, resting upon the cutter-plate C, as shown in Fig. 2.

The operation of this implement is as follows: The ridge is scraped on both sides at one operation, and the top of the slope is left with a curved surface, $m$, as shown in Fig. 1. This leaves the top of the ridge in a better condition to sustain the plant than can be effected with a scraper of ordinary construction, either single or double. The inclined plates C rest upon the surface of the ridge, causing the weight of the implement to be effectual in pressing the earth.

I do not claim broadly the construction of cotton scrapers for acting on both sides of the ridge at a single operation; but

I claim—

The longitudinally-adjustable cutters C C, having each an inclined, vertical, and curved portion, as described, in combination with mold-board supports and frame, substantially as set forth.

In testimony whereof I have hereunto signed my name before two subscribing witnesses.

J. G. WINGER.

Witnesses:
GEO. PATTEN,
JOHN S. HOLLINGSHEAD.